United States Patent [19]

Nagumo et al.

[11] Patent Number: 5,724,089
[45] Date of Patent: Mar. 3, 1998

[54] PRINTER FOR PRINTING BIT-MAPPED IMAGE RESPONSIVE TO BIT-MAPPED IMAGE SIGNAL

[75] Inventors: Akira Nagumo; Norio Nakajima; Shinichi Katakura, all of Tokyo, Japan

[73] Assignee: Oki Electric Industry Co., Ltd., Tokyo, Japan

[21] Appl. No.: 391,902

[22] Filed: Feb. 21, 1995

[30] Foreign Application Priority Data

Feb. 28, 1994 [JP] Japan .................... 6-029915
Feb. 28, 1994 [JP] Japan .................... 6-055177

[51] Int. Cl.$^6$ .................................................. B41J 2/47
[52] U.S. Cl. ........................ 347/247; 347/251; 358/296; 395/109; 395/117
[58] Field of Search ........................ 347/247, 251, 347/240, 237, 131; 358/296, 298, 300, 302; 395/109, 117

[56] References Cited

U.S. PATENT DOCUMENTS

| | | | |
|---|---|---|---|
| 5,047,844 | 9/1991 | Ikeda et al. | 358/521 |
| 5,189,523 | 2/1993 | Sugiura et al. | 358/300 |
| 5,483,625 | 1/1996 | Robertson et al. | 395/117 |
| 5,555,360 | 9/1996 | Kumazaki et al. | 395/143 |

*Primary Examiner*—Mark J. Reinhart
*Attorney, Agent, or Firm*—Panitch Schwarze Jacobs & Nadel, P.C.

[57] ABSTRACT

A printer receives a bit-mapped image signal representing an arbitrary bit-mapped image, and generates an independent pattern signal having a certain dot density, representing a shade of gray. The printer discriminates between edge dots and interior dots in the bit-mapped image signal, and generates a corresponding discrimination signal. A logic circuit outputs edge dots that are present in the bit-mapped image signal, and interior dots that are present simultaneously in the bit-mapped image signal and pattern signal. The dots output by the logic circuit are printed to produce outlines filled with a shade of gray.

19 Claims, 10 Drawing Sheets

PRINTER FOR PRINTING BIT-MAPPED IMAGE RESPONSIVE TO BIT-MAPPED IMAGE SIGNAL

BACKGROUND OF THE INVENTION

This invention relates to a printer such as an electrophotographic printer.

An electrophotographic printer forms a latent electrostatic image on a photosensitive drum, develops the image by applying toner to the drum, then transfers the resulting toner image to paper. Electrophotographic printers such as laser printers and light-emitting-diode (LED) printers have come into wide use because they are fast and relatively quiet, and because they deliver printed documents of near-typeset quality. They are often employed, for example, as output devices of personal computers, workstations, and other types of computing equipment.

Due to the speed and convenience of electrophotographic printers, however, their users tend to print numerous draft copies of documents. After each draft is printed, the user examines it, makes modifications to the document file on the computer, then prints another draft, repeating this process until a satisfactory final copy is obtained. Considerable toner is therefore expended in printing drafts that will only be thrown away. As a result, frequent toner replenishments become necessary, which increases the cost of operating the printer.

For text documents, one possible solution to this problem is to print draft copies using outline fonts, so that the outlines of characters are printed but the characters are not blackened in. Outline fonts are commonly obtained from mathematical descriptions of the shapes of the characters, from which bit maps of the character outlines can be generated.

Outline fonts can be used not only to save toner, but also to embellish the appearance of the printed output. The character outlines may then be filled in with a regular pattern having a certain dot density, so that the characters appear gray with black edges.

Yet the use of outline fonts is not without problems. One of these is that extra memory space, either in the printer itself or in the computer or workstation that controls the printer, is required to store the bit maps of the character outlines. Another problem is that it takes time to generate bit-map data from mathematical descriptions of characters, so the user may have to wait extra time to obtain printed output. A further problem is that the necessary mathematical descriptions of the characters may not be available, because many computer systems operate using purely bit-mapped fonts from the outset.

Moreover, outline fonts do not reduce toner usage in graphics. Graphics with large black areas can cause particularly rapid toner depletion.

SUMMARY OF THE INVENTION

It is accordingly an object of the present invention to provide a printer with an outline mode for printing draft copies of documents.

Another object of the invention is to print outlines, or outlines filled with a shade of gray, of arbitrary characters and graphics, without requiring extra memory for storing the outline data.

Still another object of the invention is to print such outlines without requiring extra time to generate outline font bit-map data.

The invented printer receives a bit-mapped image signal representing an arbitrary bit-mapped image. A built-in pattern generator generates a pattern signal with a certain dot density, representing a shade of gray. A discriminator generates a discrimination signal that discriminates between edge dots and interior dots in the bit-mapped image signal.

A logic circuit generates a modified bit-mapped image signal containing edge dots that are present in the bit-mapped image signal, and dots that are present simultaneously in the bit-mapped image signal and pattern signal. The modified bit-mapped image signal is provided to a print head to print a bit-mapped image comprising outlines filled with a shade of gray.

DETAILED DESCRIPTION OF THE INVENTION

Embodiments of the invention will be described with reference to the attached illustrative drawings.

Figure 1:
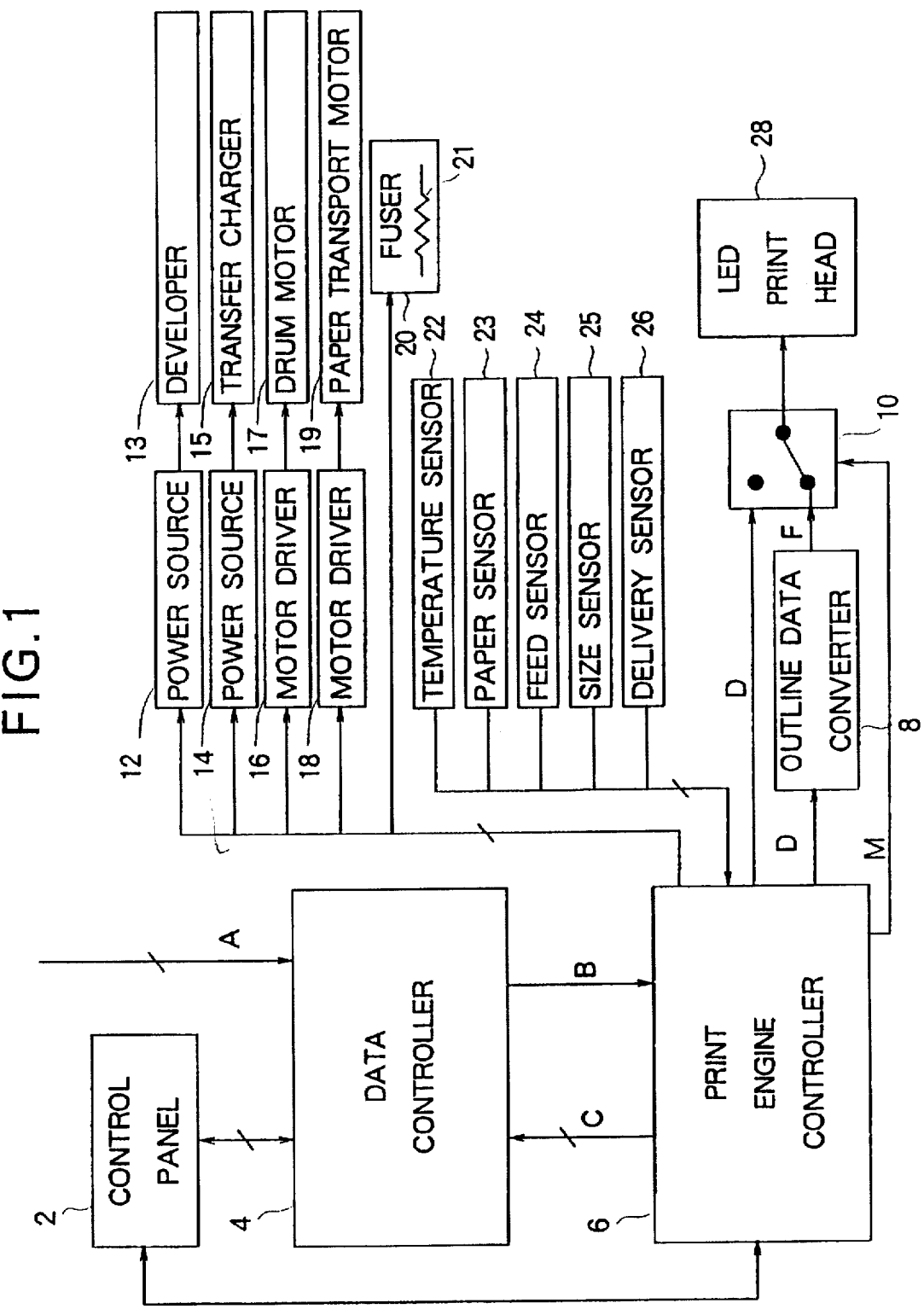
FIG. 1 is a block diagram of the invented printer.

FIG. 1 is a general block diagram of the invented printer, in which mechanical parts not relevant to the present invention have been omitted. Signal lines which are shown as single lines may actually represent multiple parallel signal lines; this is indicated by the conventional diagonal mark across the signal line.

Externally, the printer has a control panel 2 with, for example, buttons by which the user can start or stop printing and select printing modes, and a display panel by which the printer indicates printing progress, reports printing problems, and requests user intervention.

Internally, the printer has a data controller 4, a print engine controller 6, a novel outline data converter 8, a switching circuit 10, and various other circuits which will be described below.

The data controller 4 receives an input signal A from an external device such as a computer or workstation (not shown). The information in the input signal A may include commands, font data, character-code data, and bit-mapped print data. The data controller 4 comprises, for example, a microprocessor, a read-only memory (ROM) for storing programs and permanent font data, and a random-access memory (RAM) for storing additional font data and bit-mapped page data. The data controller 4 may also comprise timers, input-output ports, and other electronic components.

The print engine controller 6 receives a bit-mapped image signal B from the data controller 4, sends the data controller 4 timing signals C, and may also communicate directly with the control panel 2. Like the data controller 4, the print engine controller 6 comprises a microprocessor, memory, timers, and the like. The print engine controller 6 outputs a bit-mapped image signal D containing substantially the same dot data as the bit-mapped image signal B, and a mode select signal M. The circuits controlled by the print engine controller 6 include a high-voltage power source 12 for a developer 13, a high-voltage power source 14 for a transfer charger 15, a motor driver 18 for a drum motor 17, a motor driver 18 for a paper transport motor 19, and a fuser 20 which contains a heating element 21. The print engine controller 6 also receives input from a temperature sensor 22, paper sensor 23, feed sensor 24, size sensor 25, and delivery sensor 26.

The outline data converter 8 receives the bit-mapped image signal D from the print engine controller 6, and converts it to a modified bit-mapped image signal F. The switching circuit 10 receives both the bit-mapped image signal D and modified bit-mapped image signal F, selects one of them according to the state of the mode select signal M, and supplies the selected signal to a print head 28.

In the drawing, the print head 28 is indicated to be of the LED type, comprising an array of light-emitting diodes. However, the invention may be practiced with other types of print heads as well, such as the well-known diode laser print head.

Next a more detailed description will be given of the novel outline data converter 8, which receives the bit-mapped image signal D and outputs the modified bit-mapped image signal F. These bit-mapped image signals D and F consist of segments corresponding to individual dots which are to be printed or not printed. Dots to be printed are represented by, for example, a high voltage level, while dots that are not to be printed are represented by a lower level. That is, the bit-mapped image signals D and F can be regarded as digital signals in which individual dots have logic values of "one" or "zero." When the following descriptions and claims speak of a dot as being present in these signals, this means that the dot is to be printed (has the "one" value). When a dot is described as being absent, that means that the dot is not to be printed (has the "zero" value).

Figure 2:
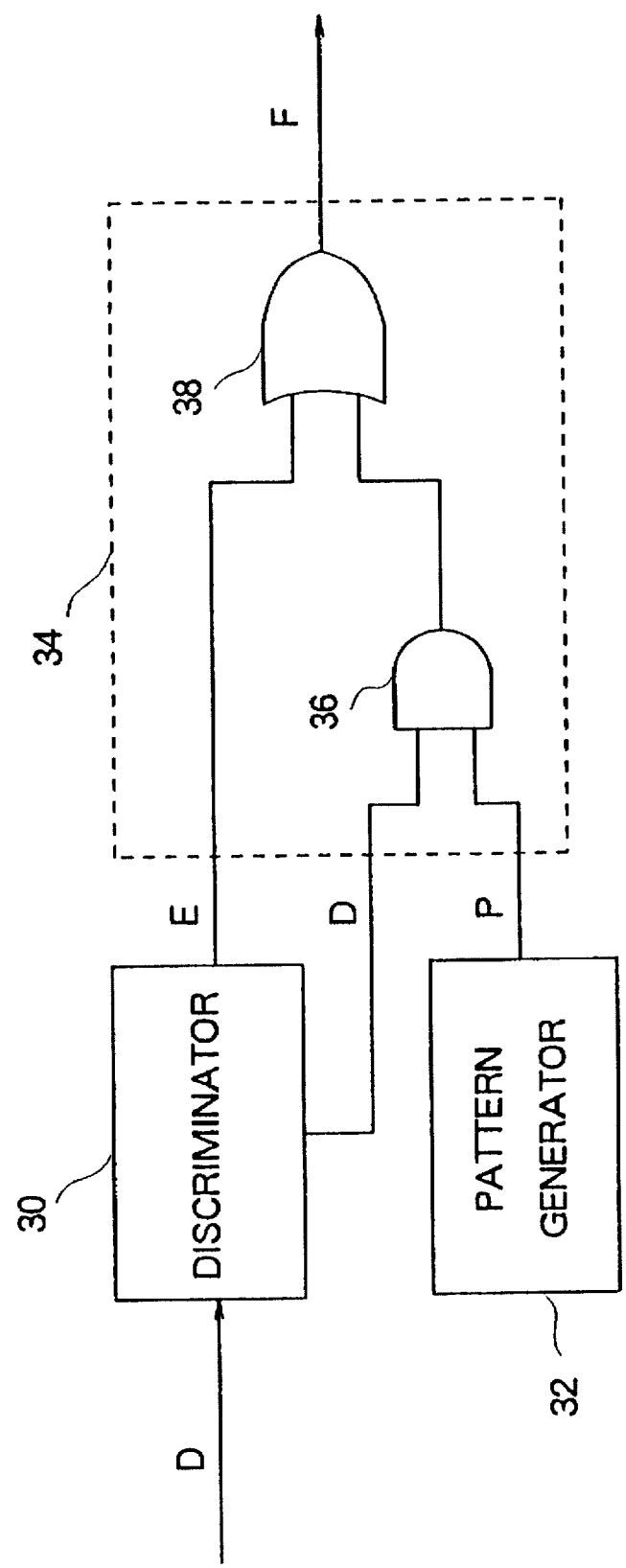
FIG. 2 is a general block diagram of the outline data converter in FIG. 1.

Referring to FIG. 2, the outline data converter 8 comprises a discriminator 30, a pattern generator 32, and a first logic circuit 34.

The pattern generator 32 generates a pattern signal P with a certain dot density, representing a shade of gray. That is, it outputs a pattern signal in which a certain percentage of dots are present.

The discriminator 30 receives the bit-mapped image signal D, tests dots present in this signal to determine whether they are edge dots or interior dots, and generates a discrimination signal that has one value for edge dots and another value for interior dots. In the present embodiment, the discrimination signal is an edge-dot signal E that has the value "one" for edge dots and the value "zero" for all other dots. The discriminator 30 also outputs the bit-mapped image signal D, possibly with a certain delay.

The first logic circuit 34 comprises, for example, an AND gate 36 and an OR gate 38. The AND gate 36 takes the logical AND of the bit-mapped image signal D and pattern signal P, which it receives from the discriminator 30 and pattern generator 32. The output of the AND gate 36 consists of dots that are simultaneously present in both the bit-mapped image signal D and pattern signal P. The OR gate 38 takes the logical OR of this output and the edge-dot signal E, thereby producing the modified bit-mapped image signal F. The modified bit-mapped image signal F accordingly contains edge dots that are present in the edge-dot signal E, and interior dots if they are present simultaneously in the bit-mapped image signal D and pattern signal P.

Figure 3:
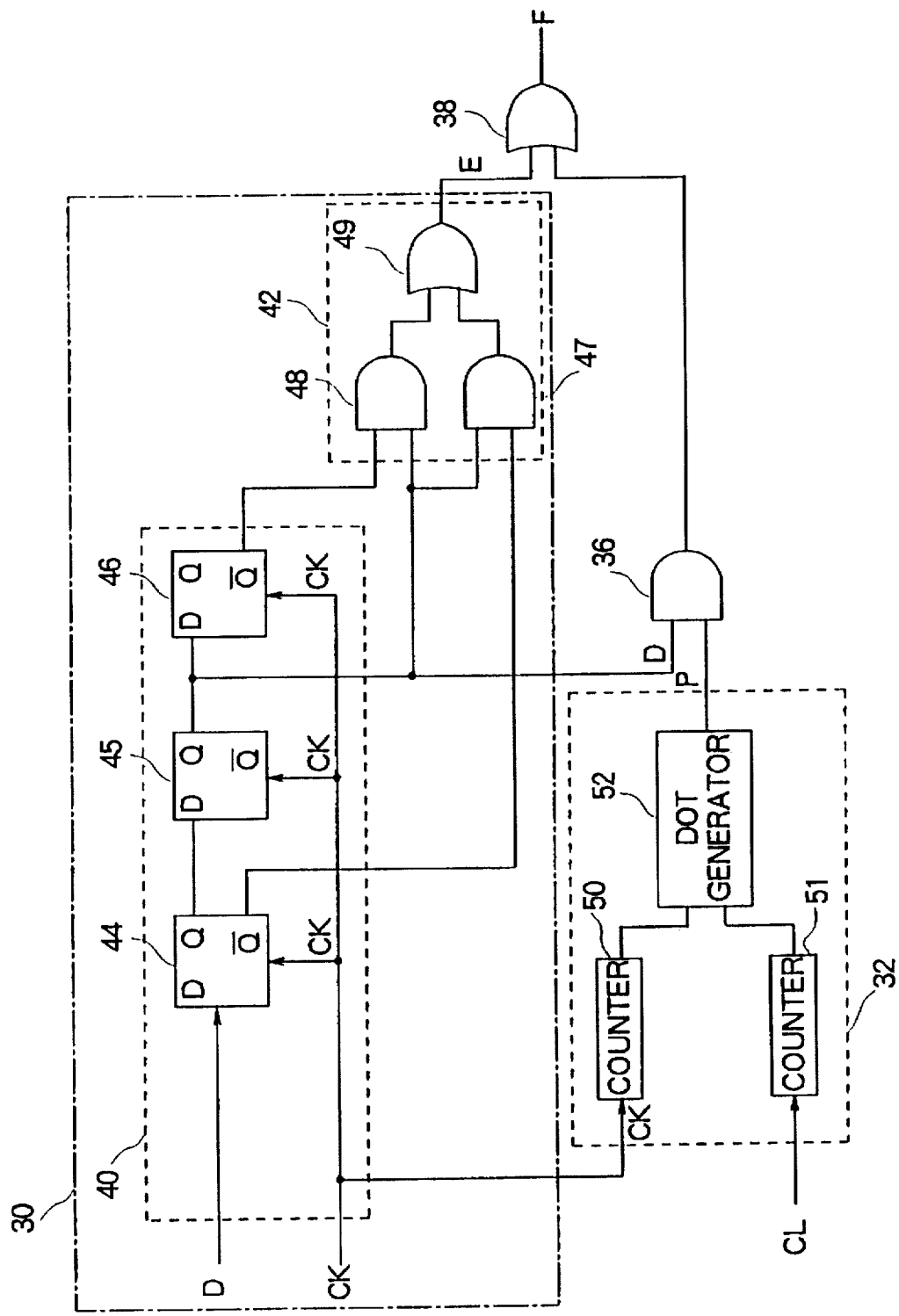
FIG. 3 is a more detailed block diagram of one embodiment of the outline data converter in FIG. 1.

FIG. 3 shows the outline data converter 8 in further detail. The discriminator 30 consists of a temporary memory 40 and a second logic circuit 42. The pattern generator 32, AND gate 36, and OR gate 38 are interconnected as in FIG. 2.

The temporary memory 40 comprises three D-type flip-flops 44, 45, and 46 coupled in series so as to temporarily store three consecutive dots in the bit-mapped image signal D. The non-inverting output (Q) of each flip-flop is coupled to the data input (D) of the next flip-flop. As a clock input, each flip-flop also receives a dot clock signal (CK), which was omitted in FIGS. 1 and 2. The dot clock signal CK has a cycle length equal to the duration of one dot in the bit-mapped image signal D. The Q output of the middle flip-flop 45 is output to the AND gate 36 as the bit-mapped image signal D.

The second logic circuit 42 comprises an AND gate 47 that takes the logical AND of the inverting output ($\bar{Q}$) of the first flip-flop 44 and the non-inverting output (Q) of the second flip-flop 45, an AND gate 48 that takes the logical AND of the non-inverting output (Q) of the second flip-flop 45 and the inverting output ($\bar{Q}$) of the third flip-flop 46, and an OR gate 49 that takes the logical OR of the outputs of these two AND gates 47 and 48, thereby producing the edge-dot signal E.

The pattern generator 32 comprises a first counter 50 that counts cycles of the dot clock CK, a second counter 51 that counts cycles of a line clock CL, and a dot generator 52 that generates the pattern signal P by performing arithmetic and logic operations on the outputs of these counters 50 and 51. The line clock CL comprises one pulse per horizontal line of dots, and indicates the positions of new dot lines in the bit-mapped image. It may also be supplied to the LED print head 28 in FIG. 1 as a latch signal.

Next the operation of the invented printer with the outline data converter 8 shown in FIG. 3 will be described, with reference to FIGS. 1 to 9.

Referring to FIG. 1, before printing begins, the operator presses a button on the control panel 2 to select the normal printing mode or outline printing mode. Alternatively, a mode selection command may be sent from the connected computer or workstation via input signal A. The print engine controller 6 responds by setting the switching circuit 10 to the corresponding state with the mode select signal M.

Next, the data controller 4 begins to receive print commands and data via input signal A. The data controller 4 responds by creating bit maps of successive pages in a part of its read-write memory, commonly referred to as the frame buffer. If the input signal A comprises bit-mapped data, the data controller 4 transfers the bit map directly to the frame buffer. If the input signal A comprises character codes, the data controller 4 reads the bit maps of the corresponding characters from another memory area and writes these bit maps on the frame buffer. If the input signal A comprises graphics drawing commands, the data controller 4 executes them to generate bit-mapped graphics on the frame buffer.

When one complete page of bit-mapped data has been prepared on the frame buffer, the data controller 4 notifies the print engine controller 6 that it is ready to print a page. The print engine controller 6 reads the temperature sensor 22 to determine whether the fuser 20 is at the necessary temperature, and if not, activates the heating element 21. When the fuser 20 is ready, the print engine controller 6 activates the motor drivers 16 and 18 to start turning a photosensitive drum and transporting paper. As the drum turns, it is charged to a negative potential, and the toner in the developer 13 is also charged to a negative potential, by the high-voltage power source 12. (The photosensitive drum, paper transport rollers, and the paper itself have been omitted from the drawing.) Paper transport is controlled using information from the sensors 23, 24, 25, and 26, which report whether paper is present in the printer, indicate when the paper reaches the required starting position, detect the size of the paper, and confirm that the paper has been successfully ejected from the printer after printing.

When the paper is ready at the starting position, the data controller 4 begins sending bit-mapped data to the print engine controller 6, one horizontal dot line at a time, in the bit-mapped image signal B. The print engine controller 6 uses the timing signals C to notify the data controller 4 when it is ready to receive the next line. As each horizontal dot line is received, the print engine controller 6 outputs it with proper timing to the outline data converter 8 and switching circuit 10 as the bit-mapped image signal D.

What happens next depends on whether normal mode or outline mode has been selected. In normal mode, the switching circuit 10 supplies the LED print head 28 with the bit-mapped image signal D output directly from the print engine controller 6. The LED print head 28 comprises a horizontal line of light-emitting diodes facing the photosensitive drum. Dots that are present in the bit-mapped image signal D turn on the corresponding diodes, which emit light, and negative charge escapes from the illuminated portions of the drum.

In this way a latent image comprising charged and non-charged dots is formed on the photosensitive drum. The non-charged dots attract toner from the developer 13, so that a toner image is formed on the drum. As the drum turns, the paper is fed past it, and the toner is attracted from the drum to the paper by a high positive voltage applied by power source 14 to the transfer charger 15. The paper is then fed through the fuser 20, and the toner is fused onto the paper by a combination of pressure and heat.

In the normal printing mode, accordingly, the toner image printed on the paper duplicates the bit-mapped image formed in the frame buffer of the data controller 4, as in a conventional printer.

If outline printing mode is designated, the switching circuit 10 selects the modified bit-mapped image signal F output by the outline data converter 8. FIGS. 4 to 8 illustrate the result for the printing of a capital "A."

Figure 4:
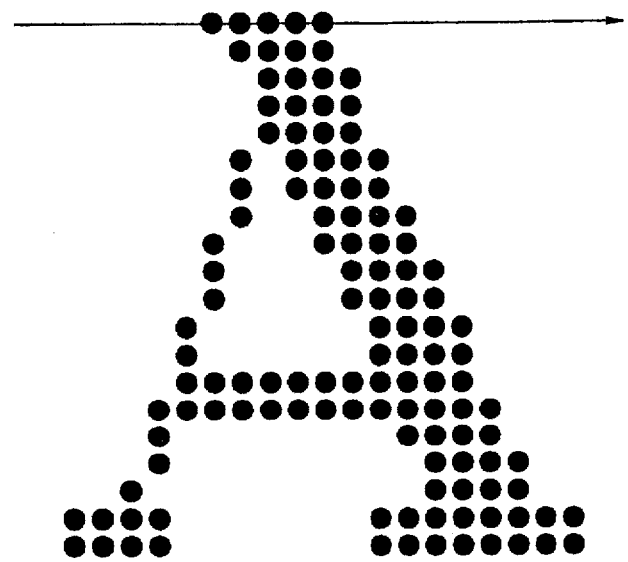
FIG. 4 shows the bit map of a capital "A."

FIG. 4 shows the bit map of the capital "A" in the memory of the data controller 4, black dots representing bits with the "one" value. The arrow indicates a scan of the dots in one horizontal line. In this particular line, five consecutive dots are present in the bit-mapped image signals B and D.

Figure 5:
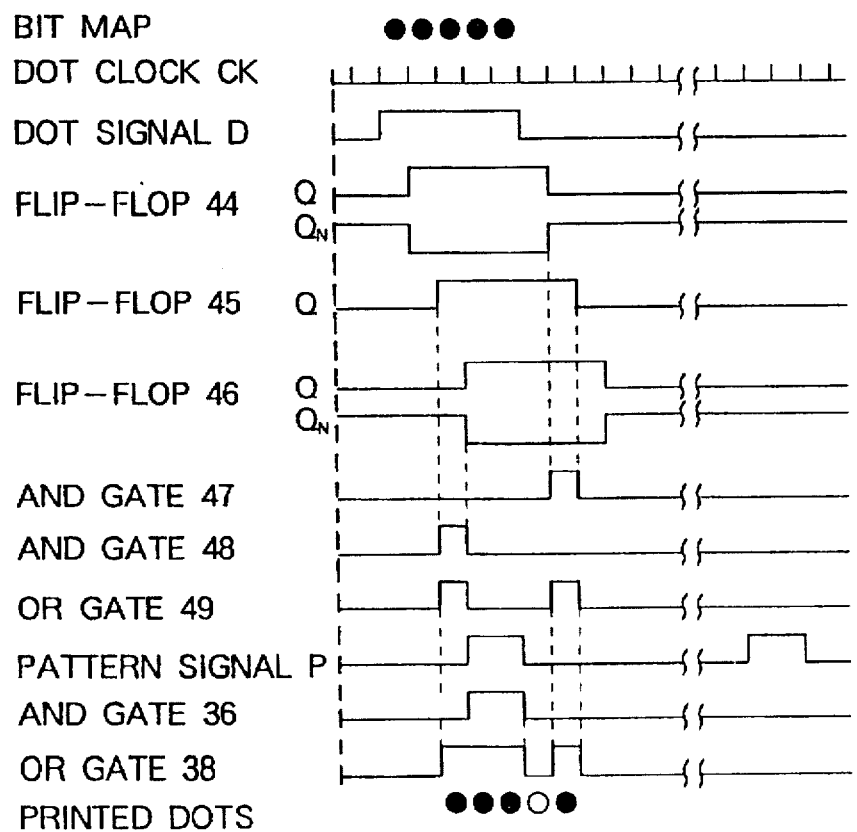
FIG. 5 is a timing diagram illustrating the operation of the outline data converter in FIG. 1.

FIG. 5 indicates in detail how these five dots are processed in the outline data converter 8 illustrated in FIG. 3. The five black dots in the original bit map are input in synchronization with the dot clock CK as one-valued bits in the bit-mapped image signal D, and are output with successive single-dot delays from the flip-flops 44, 45, and 46. This produces the indicated outputs from AND gates 47 and 48 and OR gate 49. The output from OR gate 49 is the edge-dot signal E.

In the meantime, the pattern generator 32 generates a pattern signal P comprising, for example, pairs of adjacent dots, which will be shown in more detail later. AND gate 36 passes the portions of this pattern P that coincide with dots present in the bit-mapped image signal D. OR gate 38 combines the outputs of AND gate 36 and OR gate 49, thereby producing the modified bit-mapped image signal F. The resulting printed pattern is shown at the bottom of FIG. 5. In this line, the outline data converter 8 has removed one dot, indicated by a white circle.

Figure 6:
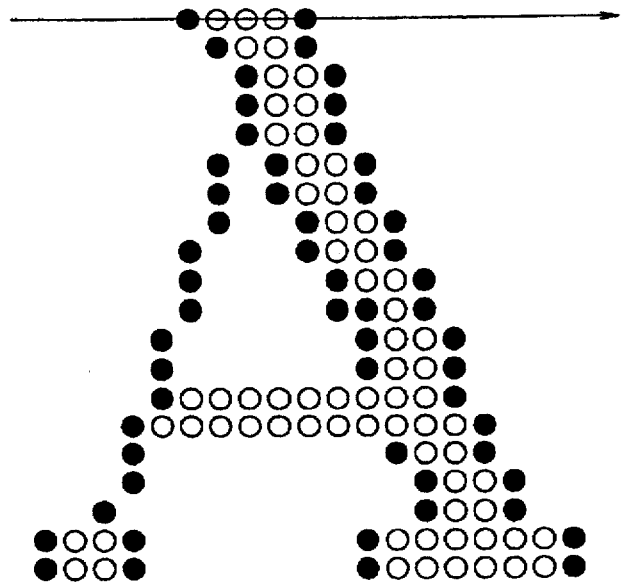
FIG. 6 shows the resulting outline of the capital "A" in FIG. 4.

FIG. 6 illustrates the edge dots present in the edge-dot signal E for the entire capital letter "A". These edge dots are shown as black circles, interior dots being indicated by white circles. The discriminator 30 in FIG. 3 detects an edge dot when the dot itself is present in the bit-mapped image signal D, but either the left-adjacent dot or the right-adjacent dot is absent (or both are absent).

Figure 7:
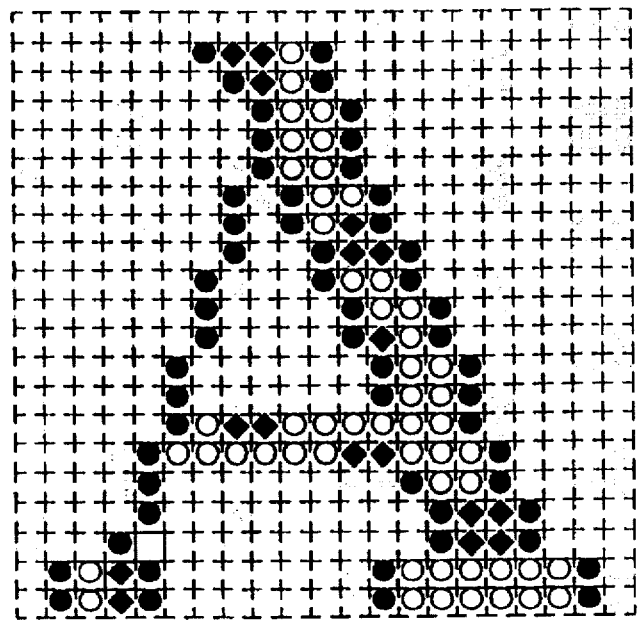
FIG. 7 shows a pattern superimposed on this outline.

FIG. 7 shows how the edge dots are combined with the pattern output by the pattern generator 32. Gray squares in FIG. 7 indicate dots present in the pattern signal P. If one of these dots is also present in the bit-mapped image signal D (that is, in the original bit map of the capital letter "A"), it is marked with a black diamond. Black circles again indicate edge dots. White circles indicate interior dots that are not present in the pattern signal P.

Figure 8:
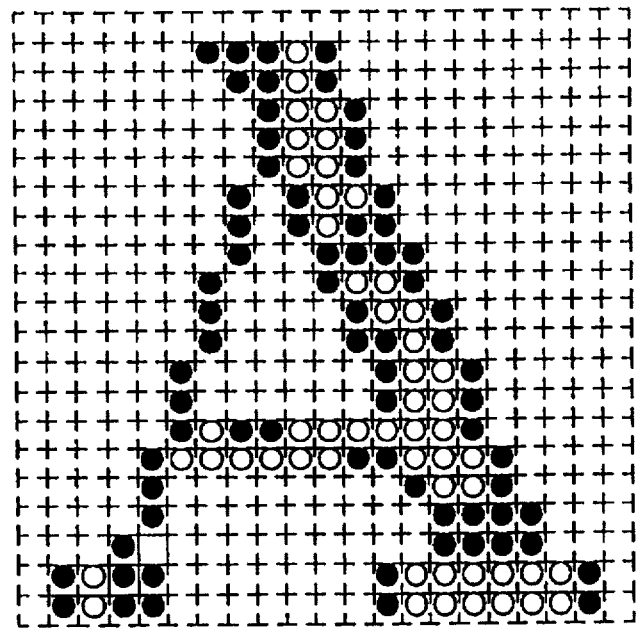
FIG. 8 shows the letter "A" as printed by the invented printer.

FIG. 8 shows the result of printing the modified bit-mapped image signal F for this capital "A." Nearly half of the dots have been eliminated, resulting in a substantial saving of toner. Although the outline is only two-sided, comprising the right and left edges of vertical and diagonal lines but not the top and bottom edges of horizontal lines, the character remains easily recognizable, and is adequately formed for draft printing purposes.

The invention is of course not limited to the pattern illustrated in FIG. 7, which provides a twenty-five-percent dot density. Any desired pattern may be used.

Figure 9:
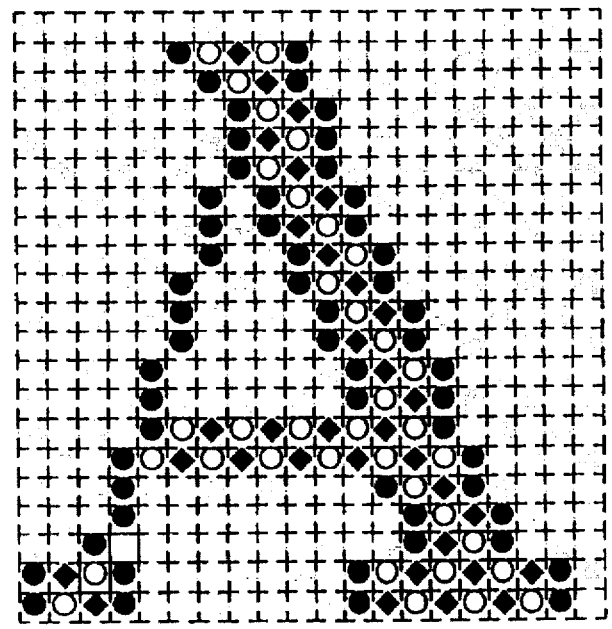
FIG. 9 shows a different pattern superimposed on the same outline.

FIG. 9, for example, shows the same capital "A" printed using a checkerboard pattern, providing a fifty-percent dot density. This still enables over one-fourth of the dots to be eliminated from the printed "A."

In FIG. 3, the discriminator 30 stores the dot being tested and just two horizontally adjacent dots, but this general scheme can be modified by storing vertically and diagonally adjacent dots as well, to obtain more complete outlines. Such a modification will be described next with reference to FIG. 10, which shows a second embodiment of the outline data converter 8.

Figure 10:
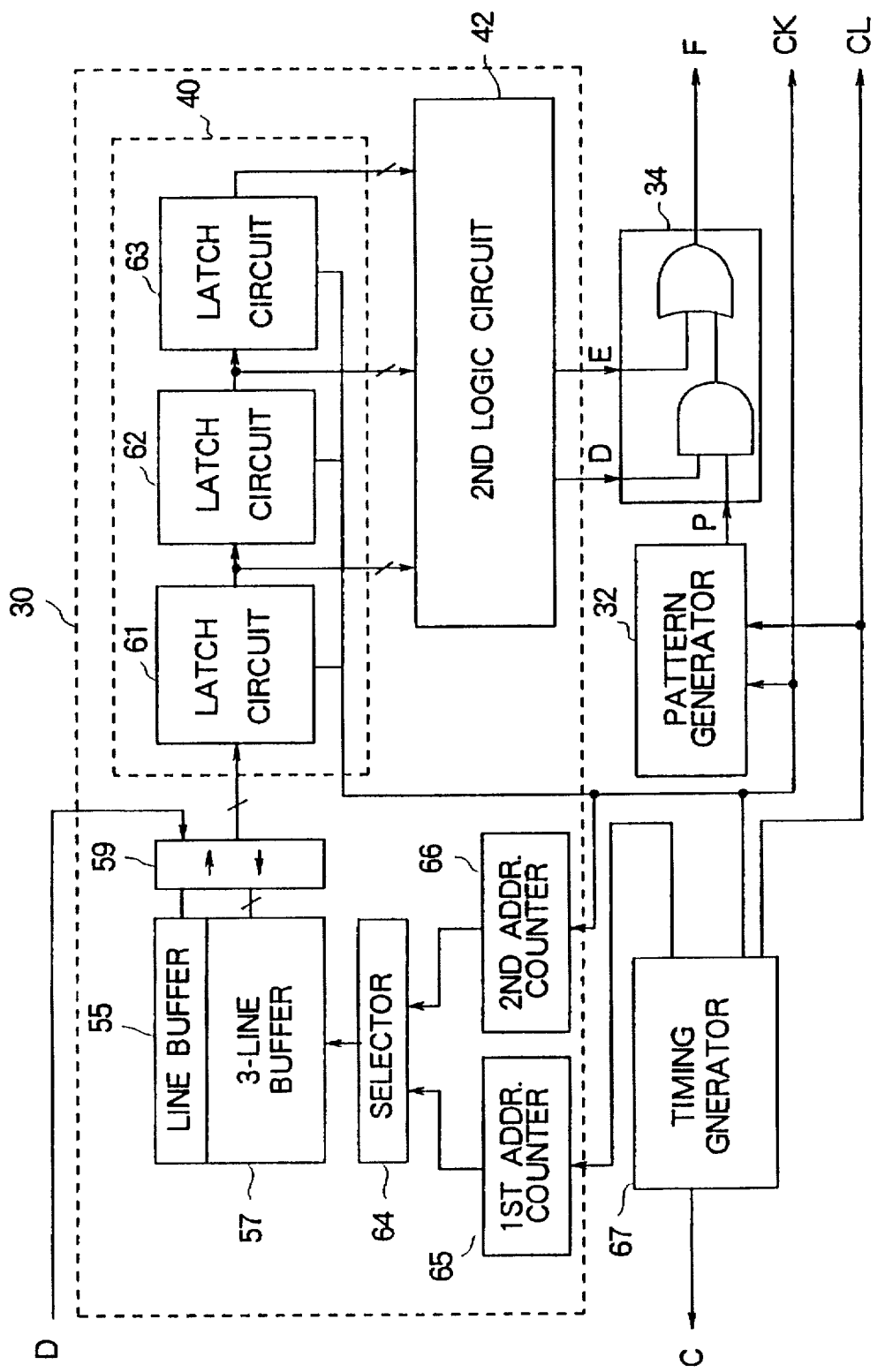
FIG. 10 is a detailed block diagram of another embodiment of the outline data converter in FIG. 1.

FIG. 10 uses the same reference numerals as in FIGS. 2 and 3 to designate the discriminator 30, pattern generator 32, first logic circuit 34, temporary memory 40, and second logic circuit 42. The internal configurations of the discriminator 30 and its temporary memory 40 and second logic circuit 42, however, differ from FIG. 3.

The discriminator 30 in FIG. 10 comprises a line buffer 55 for storing one horizontal line of the bit-mapped image signal D, a three-line buffer 57 for storing three such horizontal lines, and an interface circuit 59 coupled to these buffers 55 and 57 for signal input and output. Output from the three-line buffer 57 is fed to a series of three latch circuits 61, 62, and 63 in the temporary memory 40. Each of these latch circuits 61, 62, and 63 has flip-flops for storing three bits (three dots). Together, the three latch circuits 61, 62, and 63 store the values of nine dots, forming a three-by-three matrix consisting of three horizontally adjacent dots in three vertically adjacent lines.

Internal details of the second logic circuit 42 will be omitted; it is generally similar to the logic circuit 42 in FIG. 3, but has nine inputs (three from each of the latch circuits 61, 62, and 63) and a different gate configuration. One possible configuration comprises an eight-input NAND gate coupled to perform a logical NOT-AND operation on the eight outer dots of the three-by-three dot matrix, and an AND gate coupled to take the logical AND of the middle dot with the output of this NAND gate.

The second logic circuit 42 outputs the edge-dot signal E and bit-mapped image signal D, which is obtained from the middle flip-flop of the middle latch circuit 62 and represents the middle dot of the three-by-three matrix. This middle dot is recognized as an edge dot if it is present while at least one of the other eight dots stored in the latch circuits 61, 62, and 63 is absent. The edge-dot signal E consists of the edge dots thus recognized.

In addition, the discriminator 30 in FIG. 10 comprises a selector 64 and a pair of address counters 65 and 66. The first address counter 64 generates receive addresses, indicating positions in the line buffer 55 at which incoming dots in the bit-mapped image signal D are to be stored. The second address counter 65 generates column addresses from which dots are transferred, three at a time, from the three-line buffer 57 to the first latch circuit 61. The selector 64 routes addresses from the first address counter 65 to the line buffer 55, and addresses from the second address counter 66 to the three-line buffer 57.

As in FIG. 3, the pattern generator 32 receives a dot clock CK and line clock CL, which are generated by a timing generator 67 in the print engine controller 6. The dot clock CK is also supplied to the latch circuits 61, 62, and 63 and second address counter 66, to synchronize the transfer of dot data from the three-line buffer 57 to the latch circuits 61, 62, and 63 and second logic circuit 42. A similar timing signal is supplied to the first address counter 65. The timing generator 67 also outputs the timing signals C noted in FIG. 1, and supplies CK and CL to other circuits not shown in the drawings.

The operation of this second discriminator 30 will be illustrated with reference to FIGS. 11 to 13.

Figure 11:
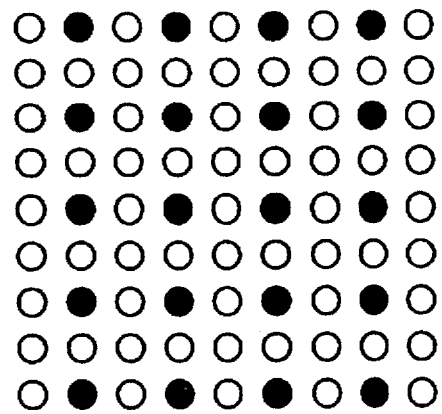
FIG. 11 illustrates still another pattern.

FIG. 11 shows the pattern output by the pattern generator 32 in FIG. 10. This pattern is a twenty-five-percent dot-density pattern obtained by removing alternate dots in both the horizontal and vertical directions. It can be created very easily by counting the clock signals CK and CL and generating a dot if and only if both counts are even.

Figure 12:
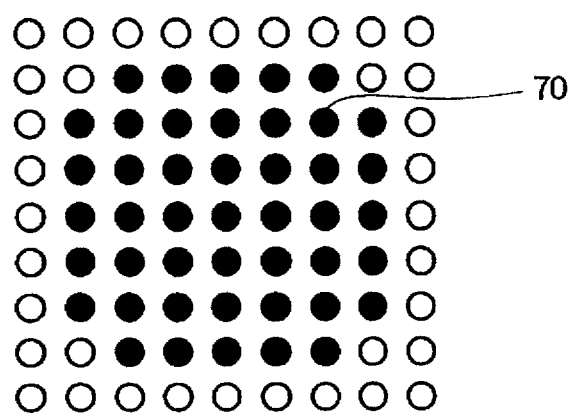
FIG. 12 shows the bit map of a black disc.

FIG. 12 shows a bit map of a small black disc, which could be used to print a "period" character (.). A dot in this figure is recognized as an edge dot by the discriminator 30 in FIG. 10 if at least one of its horizontally, vertically, or diagonally adjacent dots is not present. For example, dot 70 is an edge dot because one diagonally adjacent dot is missing.

Figure 13:
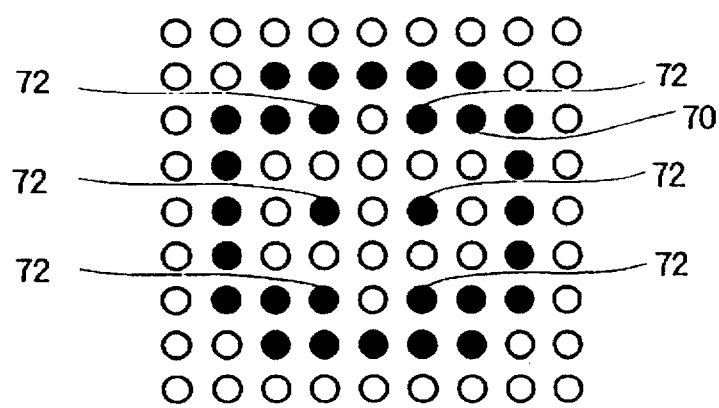
FIG. 13 shows the outline of the black disc in FIG. 12 combined with the pattern in FIG. 11.

FIG. 13 shows how the disc in FIG. 12 is printed in outline mode. The printed output consists of edge dots such as the dot 70, and six more dots 72 from FIG. 11, which are added by the pattern generator 32.

From FIG. 13 it can be seen that the discriminator 30 in FIG. 10 produces clean, complete outlines which are suitable not only for saving toner but also for printing embellished characters and graphics with emphasized edges.

The configurations of the discriminator 30 and first logic circuit 32 can be modified in innumerable ways. For example, FIG. 14 shows a third embodiment of the outline data converter 8, in which the discriminator 30 has a NAND gate 80 for identifying interior dots in the bit-mapped image signal D.

Figure 14:
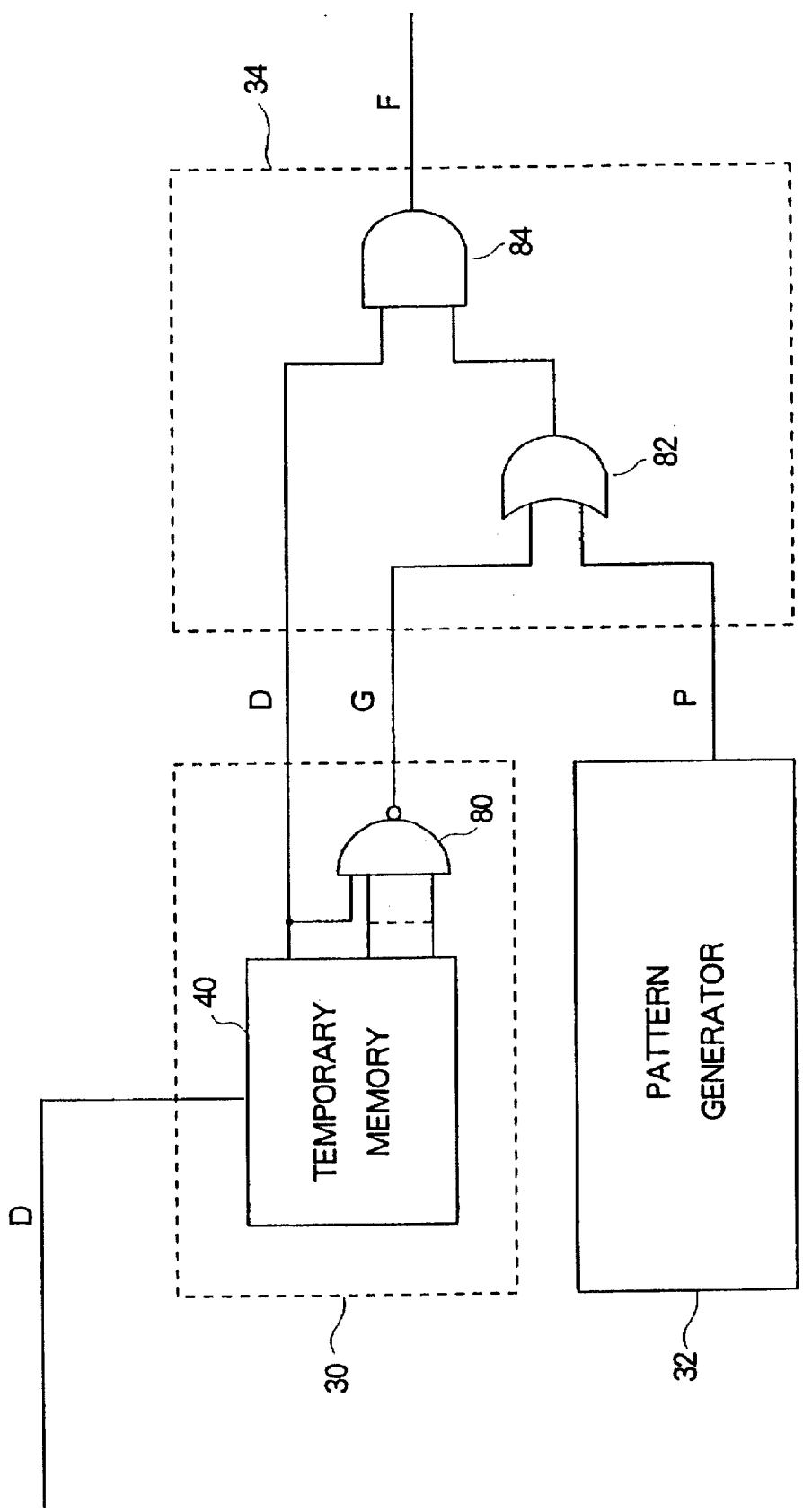
FIG. 14 is a block diagram of yet another embodiment of the outline data converter.

The temporary memory 40 in FIG. 14 stores the values of a certain number of adjacent dots: for example, three horizontally adjacent dots as in FIG. 3, or nine adjacent dots as in FIG. 10. The value of a particular one of these dots, e.g. the middle dot, is output as the bit-mapped image signal D. The values of all the stored adjacent dots are input to the NAND gate 80, which detects their simultaneous presence. The discrimination signal G generated by this NAND gate 80 has the value "zero" for interior dots in the bit-mapped image signal D, and the value "one" for dots that are not interior dots, including both edge dots present in the bit-mapped image signal D and dots that are absent in the bit-mapped image signal D.

The first logic circuit 34 in FIG. 14 comprises an OR gate 82 that takes the logical OR of this discrimination signal G and the pattern signal P from the pattern generator 32, and an AND 84 gate that takes the logical AND of the bit-mapped image signal D and the output of OR gate 82. The output of AND gate 84 is the modified bit-mapped image signal F. This signal F consists of dots that are simultaneously present in the bit-mapped image signal D and pattern signal P, and dots that are present in the bit-mapped image signal D but are not interior dots, hence are edge dots. The modified bit-mapped image signal F in FIG. 14 is accordingly similar to the modified bit-mapped image signal F in FIG. 3 or FIG. 10.

Figure 15:
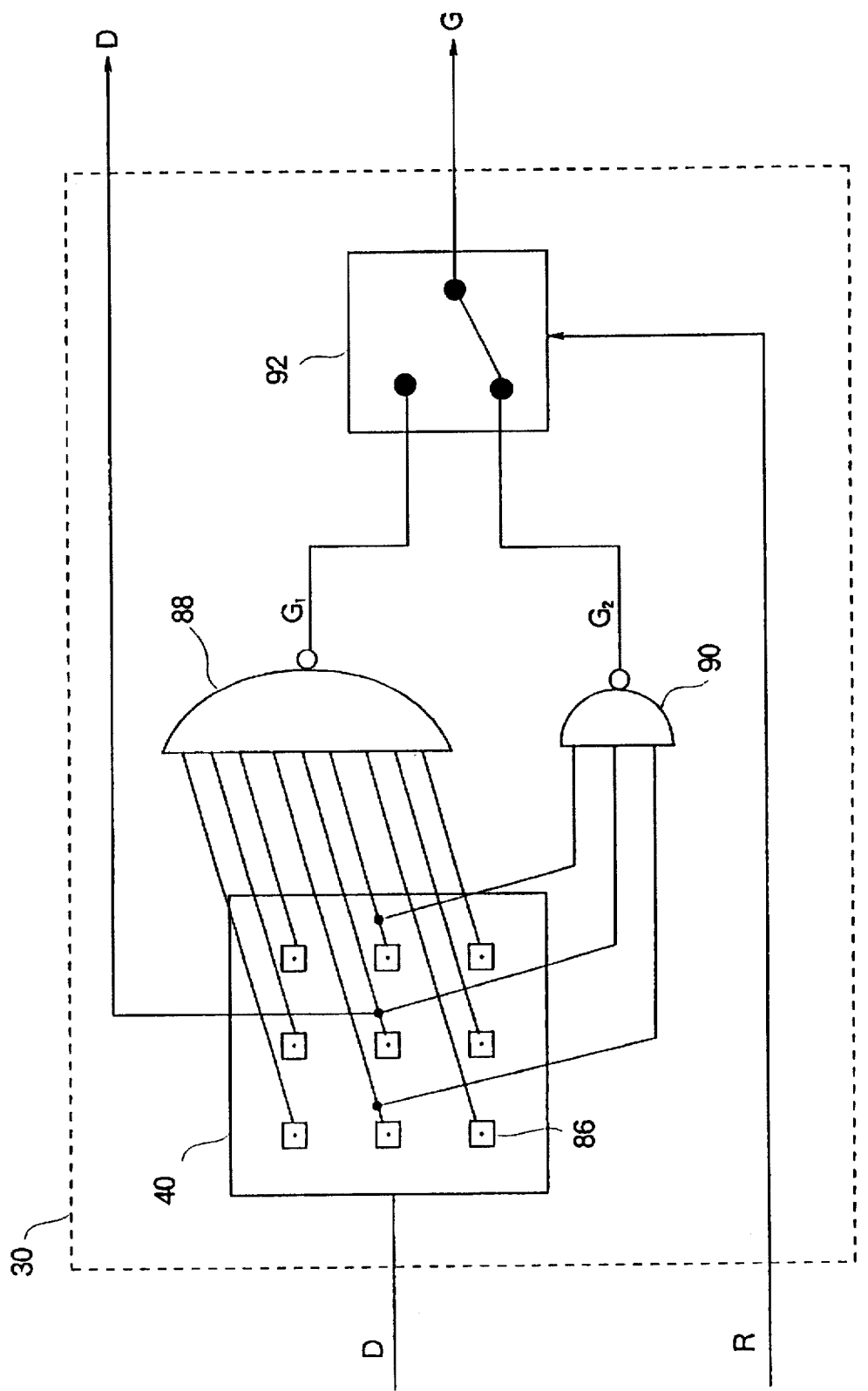
FIG. 15 is a block diagram showing a variation of the discriminator in FIG. 14.

FIG. 15 shows a modification of the discriminator 30 in FIG. 14 that provides a selection between two methods of discriminating interior dots. The temporary memory 40 in FIG. 15 has memory cells 86 for storing the values of nine dots disposed in a three-by-three matrix, as in the second embodiment. The value of the middle dot in this matrix is output as the bit-mapped image signal D. A nine-input NAND gate 88 performs a logical NAND operation on the values of all nine dots to produce a first internal discrimination signal $G_1$. A three-input NAND gate 90 performs a logical NAND operation on the middle dot and its two horizontally adjacent dots to produce a second internal discrimination signal $G_2$.

An internal switching circuit 92 selects one of the two internal discrimination signals $G_1$ and $G_2$ for output as the discrimination signal G, which is used in the same way as the discrimination signal G in FIG. 14. The internal switching circuit 92 is controlled by a signal R output from the print engine controller 6 in FIG. 1, responsive to a command received from the control panel 2, or a command received via input signal A.

When internal discrimination signal $G_1$ is selected, edge dots are discriminated according to the values of all nine dots in the three-by-three matrix, yielding complete outlines as illustrated in FIG. 13. When internal discrimination signal $G_2$ is selected, edge dots are discriminated according to the values of the three dots in the middle horizontal row, yielding two-sided outlines as illustrated in FIG. 8. The user can select the type of discrimination according to the type of material being printed.

For example, if text with very small-sized characters is printed using two-sided outline discrimination, the characters become hard to read, so the user may prefer complete outlines. If the complete outline method is used on graphics in which gray scales are produced by dithering, however, most dots tend to be identified as edge dots, so there is comparatively little difference between outline mode and normal mode. If the user is interested in conserving toner, he may need to use two-sided outlines for such graphics. As a general policy, a user may decide to use complete outline mode for most of his printing, reserving two-sided outline mode for rough draft work, and normal mode for printing high-quality graphics such as scanned photographic images.

The concept of FIG. 15 can be extended by providing the discriminator 30 with any number of logic circuits for examining arbitrary different groups of dots with values stored in the temporary memory 40, and producing respective internal discrimination signals according to the presence or absence of dots in these groups. An internal switching circuit selects one of the internal discrimination signals. For example, another three-input NAND gate could be added to FIG. 15 to examine the three dots in the middle vertical column, thereby detecting horizontal edges instead of vertical edges.

In the preceding embodiments the discriminator 30 examined only immediately adjacent dots, but if thicker outlines are desired, additional dots can be processed. For example, the discriminator can examine a given dot and all dots located within a certain distance of this dot, this distance serving to define the meaning of "adjacent."

The definition of "adjacent" need not be symmetrical. For example, instead of testing both left and right adjacent dots as in FIGS. 3 to 9, the discriminator 30 could test only the right adjacent dot, thereby generating one-sided outlines instead of two-sided outlines.

From the foregoing descriptions it will be apparent that the invented printer can generate outlines of any characters or graphics, and can fill these outlines with a shade of gray. As was shown in FIG. 5, the outline data converter 8 operates in real time, so the outline mode of operation does not cause any noticeable delay. Moreover, no extra memory is required for storing outline fonts, because the outline bit maps are generated "on the fly."

The novel outline data converter 8 comprises a simple pattern generator 32, a small temporary memory 40, and some additional logic. Such circuitry takes up little space. Although the outline data converter 8 is shown disposed between the print engine controller 6 and print head 28 in FIG. 1, it could easily be incorporated into either the print engine controller 6 or the print head 28.

Use of the outline printing mode can save substantial amounts of toner in printing draft copies. If the printer is adapted so that the switching circuit 10 is controlled by commands in the input signal A, the outline mode can also be used selectively, to embellish particular characters or graphics. Attractive title lines, for example, can be printed in this way.

The invention can be practiced without the switching circuit 10, if the pattern generator 32 is adapted to produce patterns of different dot densities. All printing can then be done in outline mode. If the density of the pattern is one hundred percent (solid black), the result is the same as in normal mode. If the density is zero (solid white), only outlines are printed, for maximum toner saving. Intermediate densities provide characters (or graphics) that appear gray with black edges.

Use of the invention is not restricted to electrophotographic printers. The invention can also be practiced in other types of printers.

Those skilled in the art will recognize that further modifications can be made to the above embodiments without departing from the scope claimed below.

What is claimed is:

1. A printer for printing a bit-mapped image responsive to a bit-mapped image signal having interior dots and edge dots, the printer comprising:
    a pattern generator having an output, the pattern generator for generating a pattern signal having a plurality of dots and a plurality of absences of dots and outputting the pattern signal at the output thereof;
    a discriminator having an input for receiving the bit-mapped image signal and an output, the discriminator for discriminating between the edge dots and the interior dots present in the bit-mapped image signal, the discriminator for producing a discrimination signal and outputting the discrimination signal at the output thereof, the discrimination signal having one value for the edge dots and a different value for the interior dots;
    a first logic circuit having a first input coupled to the output of the pattern generator for receiving the pattern signal, a second input coupled to the output of the discriminator for receiving the discrimination signal, and an output, the first logic circuit for producing a modified bit-mapped image signal and outputting the modified bit-mapped image signal at the output thereof, the modified bit-mapped image signal having the edge dots present in the bit-mapped image signal, the modified bit-mapped image signal also having each interior dot present in the bit-mapped image signal if a dot corresponding to such interior dot is present in the pattern signal; and
    a print head having an input coupled to the output of the first logic circuit for receiving the modified bit-mapped image signal, the print head for creating a bit-mapped image according to the modified bit-mapped image signal.

2. The printer of claim 1, comprising a switching circuit coupled between said first logic circuit and said print head, for receiving said bit-mapped image signal and said modified bit-mapped image signal, selecting one signal from among said bit-mapped image signal and said modified bit-mapped image signal, and supplying the signal thus selected to said print head.

3. The printer of claim 1, wherein said discriminator comprises a temporary memory circuit for receiving said bit-mapped image signal, and storing values of a certain number of adjacent dots.

4. The printer of claim 3, wherein said temporary memory circuit stores values of three said adjacent dots, which follow one another consecutively in said bit-mapped image signal.

5. The printer of claim 3, wherein said temporary memory circuit stores values of nine dots which are horizontally, vertically, and diagonally adjacent, forming a three-by-three matrix, in said bit-mapped image.

6. The printer of claim 3, wherein said discriminator comprises a second logic circuit coupled to said temporary memory circuit, for detecting presence of a particular one of said adjacent dots combined with absence of at least another one of said adjacent dots.

7. The printer of claim 3, wherein said discriminator comprises a second logic circuit coupled to said temporary memory circuit, for detecting simultaneous presence of all of said adjacent dots.

8. The printer of claim 3, wherein said discriminator comprises:
    a plurality of logic circuits for examining values of different groups of dots stored in said temporary memory circuit and generating respective internal discrimination signals responsive to presence and absence of dots in respective groups; and an internal switching circuit for selecting one of said internal discrimination signals as said discrimination signal.

9. The printer of claim 8, wherein said temporary memory circuit stores values of nine dots which are horizontally, vertically, and diagonally adjacent, forming a three-by-three matrix, in said bit-mapped image, and said plurality of logic circuits comprises:

a third logic circuit for examining the values of all nine dots stored in said temporary memory circuit and generating a first internal discrimination signal; and a fourth logic circuit for examining the values of three horizontally adjacent dots stored in said temporary memory circuit and generating a second internal discrimination signal.

10. The printer of claim 1, wherein said pattern generator comprises:

a first counter for receiving and counting a dot clock signal indicating positions of individual dots in said bit-mapped image signal;

a second counter for receiving and counting a line clock signal indicating positions of new lines in said bit-mapped image; and a dot generator for generating dots responsive to outputs of said first counter and said second counter.

11. A method of printing outlines of characters and graphics filled with a pattern, comprising the steps of:

receiving a bit-mapped image signal representing a bit-mapped image, the bit-mapped image and the bit-mapped image signal having interior dots and edge dots;

identifying the edge dots and the interior dots in said bit-mapped image signal;

generating a pattern signal having a plurality of dots and a plurality of absences of dots;

printing said edge dots; and printing each interior dot in the bit-mapped image signal if a dot corresponding to such interior dot is present in the pattern signal.

12. The method claim 11, wherein identifying edge dots and interior dots comprises storing values of at least two adjacent dots in a temporary memory circuit.

13. The method of claim 12, wherein said temporary memory circuit stores values of three said adjacent dots, which follow one another consecutively in said bit-mapped image signal.

14. The method of claim 12, wherein said temporary memory circuit stores values of nine said adjacent dots, which are horizontally, vertically, and diagonally adjacent, forming a three-by-three matrix, in said bit-mapped image.

15. The method of claim 12, wherein identifying edge dots and interior dots comprises detecting presence of a particular one of said adjacent dots combined with absence of at least another one of said adjacent dots.

16. The method of claim 12, wherein identifying edge dots and interior dots comprises detecting simultaneous presence of all of said adjacent dots.

17. The method of claim 11, wherein identifying edge dots and interior dots comprises:

storing a certain number of adjacent dots in a temporary memory circuit;

examining values of different groups of dots stored in said temporary memory circuit and generating respective internal discrimination signals responsive to presence and absence of dots in said groups; and selecting one of said internal discrimination signals.

18. The method of claim 17, wherein:

said temporary memory circuit stores values of nine said adjacent dots, which are horizontally, vertically, and diagonally adjacent, forming a three-by-three matrix, in said bit-mapped image;

one of said groups comprises all nine of said adjacent dots; and another one of said groups comprises three horizontally adjacent dots.

19. The method of claim 11, wherein generating a pattern comprises:

counting a dot clock signal indicating positions of individual dots in said bit-mapped image signal;

counting a line clock signal indicating positions of new dot lines in said bit-mapped image; and generating dots responsive to counts of said dot clock signal and said line clock signal.

* * * * *